United States Patent
Cath et al.

(10) Patent No.: US 8,930,189 B2
(45) Date of Patent: Jan. 6, 2015

(54) DISTRIBUTED USER INPUT TO TEXT GENERATED BY A SPEECH TO TEXT TRANSCRIPTION SERVICE

(75) Inventors: Jeremy Edward Cath, Redmond, WA (US); Timothy Edwin Harris, Lafayette, CO (US); Marc Mercuri, Bothell, WA (US); James Oliver Tisdale, III, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 13/283,624

(22) Filed: Oct. 28, 2011

(65) Prior Publication Data

US 2013/0110509 A1      May 2, 2013

(51) Int. Cl.
  *G10L 15/26*     (2006.01)
(52) U.S. Cl.
  USPC ............ 704/235; 704/239; 704/240; 704/270
(58) Field of Classification Search
  USPC ............ 704/1–10, 235, 220, 270, 270.1, 251, 704/239, 240; 379/202.01
  See application file for complete search history.

(56) References Cited

U.S. PATENT DOCUMENTS

| | | | | |
|---|---|---|---|---|
| 6,363,342 B2 * | 3/2002 | Shaw et al. | | 704/220 |
| 8,041,565 B1 | 10/2011 | Bhardwaj et al. | | |
| 8,041,573 B2 * | 10/2011 | Da Palma et al. | | 704/270 |
| 2004/0158469 A1 | 8/2004 | Brand | | |
| 2008/0154949 A1 | 6/2008 | Brooks et al. | | |
| 2009/0216531 A1 | 8/2009 | Yanagihara | | |
| 2009/0234651 A1 | 9/2009 | Basir et al. | | |
| 2010/0057461 A1 | 3/2010 | Neubacher et al. | | |
| 2010/0312555 A1 | 12/2010 | Plumpe et al. | | |
| 2011/0112836 A1 | 5/2011 | Kurki-Suonio et al. | | |
| 2011/0153324 A1 | 6/2011 | Ballinger et al. | | |
| 2012/0290299 A1 * | 11/2012 | Basson et al. | | 704/235 |
| 2013/0058471 A1 * | 3/2013 | Garcia | | 379/202.01 |

FOREIGN PATENT DOCUMENTS

| | | |
|---|---|---|
| CN | 1279461 A | 1/2001 |
| CN | 1341255 A | 3/2002 |
| CN | 101075435 A | 11/2007 |
| CN | 102084417 A | 6/2011 |

OTHER PUBLICATIONS

McClure et al., "Overcoming the MT Quality Impasse", Retrieved at <<http://wwwv5.systransoft.com/IDC/29917.htm>>, SYSTRAN Language Translation Technology, Study #29917, Dated: Aug. 2003, pp. 7.

"Telling TALES to address translation challenges", Retrieved at <<http://domino.watson.ibm.com/comm/research.nsf/pages/r.nlp.innovation.tales.html>>, IBM Research, Retrieved Date: Jul. 15, 2011, pp. 3.

(Continued)

*Primary Examiner* — Huyen X. Vo
(74) *Attorney, Agent, or Firm* — Kevin Sullivan; Kate Drakos; Micky Minhas (57) ABSTRACT

A particular method includes receiving, at a representational state transfer endpoint device, a first user input related to a first speech to text conversion performed by a speech to text transcription service. The method also includes receiving, at the representational state transfer endpoint device, a second user input related to a second speech to text conversion performed by the speech to text transcription service. The method includes processing of the first user input and the second user input at the representational state transfer endpoint device to generate speech to text adjustment information.

20 Claims, 6 Drawing Sheets

(56) References Cited

OTHER PUBLICATIONS

Zhang, et al., "A Novel Decision Function and the Associated Decision-Feedback Learning for speech translation", Retrieved at <<http://research.microsoft.com/pubs/150030/0005608.pdf>>, IEEE International Conference on Acoustics, Speech and Signal Processing, May 22-27, 2011, pp. 5608-5611.

"Speech Recognition for Dictation, Broadcast and Telephony", Retrieved at <<http://www.apptek.com/images/Product_PDFs/PlainSpeech%20_2010_Product_Data_Sheet.pdf>>, AppTek Inc., Retrieved Date: Jul. 15, 2011, pp. 2.

"Language Translation Tool: Speech Recognition and Translation", Retrieved at <<http://www.language-translation-help.com/language-translation-tool.html>>, Retrieved Date: Jul. 15, 2011, pp. 3.

"International Search Report", Mailed Date: Mar. 4, 2013, Application No. PCT/US2012/060171, Filed Date: Oct. 15, 2012, pp. 10.

Notice of the First Office Action, The State Intellectual Property Office of the People's Republic of China, Application No. 201210419251.4, Mailed Sep. 2, 2014, 18 pages.

* cited by examiner

DISTRIBUTED USER INPUT TO TEXT GENERATED BY A SPEECH TO TEXT TRANSCRIPTION SERVICE

BACKGROUND

Interfaces for software used by computing devices, such as personal computers, laptops, tablets, gaming devices, and phones, are increasing usage of speech recognition, and the demand for high quality in automated audio to textual content is also increasing. Machine algorithms have been used for speech to text conversion, but such algorithms often generate text with errors.

SUMMARY

A mechanism to utilize crowd sourcing to increase the quality of speech to text transcription is disclosed. In a particular embodiment, a method includes receiving at a representational state transfer (REST) endpoint device a first user input related to a first speech to text conversion performed by a speech to text transcription service, receiving at the REST endpoint device a second user input related to a second speech to text conversion performed by the speech to text transcription service, and processing the first user input and the second user input at the REST endpoint device to generate speech to text adjustment information. Processing at the REST endpoint device enables the use of crowd sourcing (e.g., using input from the first user, the second user and possibly one or more additional users) to improve the speech to text transcription service.

In another aspect, a computer readable storage device includes instructions executable by a computer to receive captured speech data from a plurality of client devices, to convert the captured speech data to text for each of the plurality of client devices, and to send payload data that includes the text to each of the plurality of client devices. The payload data includes at least one attribute that indicates a location of a device that is configured to process user input related to the perceived accuracy of the conversion of the captured speech data to the text.

In another aspect, a computer implemented method includes sending captured speech data to a speech to text transcription service, receiving a payload including text from the speech to text transcription service, displaying the text at a display device of an electronic device, displaying a user interface at the display device, where the user interface enables a user to provide user input regarding the accuracy of the text, receiving the user input and at least one phoneme alternative to the text, and communicating the user input to a remote device. The remote device may be a REST endpoint device. Thus, a method and system of crowd sourcing may improve speech to text transcription results.

DETAILED DESCRIPTION

Crowd sourcing of quality of speech to text transcription across a diversity of devices, device manufacturers, and carriers provides a method of improving machine algorithms for speech to text transcription. For example, in a particular implementation, when speech to text transcription is performed by an algorithmic process, several attributes may be attached along with transcribed text to a payload. The attributes may include an attribute that indicates that the transcribed text provided was machine translated, an attribute that specifies an acceptable user feedback scale range for voting on a quality of the transcribed text, and an attribute that identifies a representational state transfer (REST) endpoint device where voting on the quality of the text is to be provided. Optionally, the payload can include additional attributes based on user opt-in settings of an initiating device (e.g., a client device from which the transcribed speech was received). The attributes may include a language of a speaker, which may be explicitly collected by an initiating application of the initiating device or may be derived from a base language of an operating system of the initiating device, a current location of the speaker, and a uniform resource locator (URL) for the initiating application.

When the payload is delivered to a client device (e.g., a mobile phone, a television, a computer, a tablet, a gaming device, etc.), the client device can optionally expose a user interface to enable the recipient to vote on the quality of the translation. The interface may be appropriate to the application experience (e.g., the interface may be generated based on a particular application that is executing at the client device) and within constraints identified by a range in the payload.

For example, the user interface may be implemented as three buttons, "Great", "Close" or "Awful". Alternately or in addition, the user interface may be implemented as a set of thumbs up or thumbs down buttons, a slider control that represents a range, or a star rating system. A rating provided by the user may be sent to the URL of the REST endpoint device that was identified as an attribute in the payload. The REST endpoint device can be a centralized service and does not need to be tied to the originator of the initiating application or to the client device. For example, different handset manufacturers may create applications that utilize speech to text translation for mobile devices and that provide user data to the REST endpoint device. The REST endpoint device may be centralized with a particular party (e.g. a third party service) or may be specific to a handset manufacturer or mobile carrier. Ratings provided by each user are used as votes, optionally in combination with source language and/or user location information, to enhance speech to text translation engines with contextual and geographic data that can aid in more accurate translations, specifically towards regional dialects and accents, emerging language and slang additions, etc. Thus, the REST endpoint device, operating in conjunction with the client device and the speech to text transcription service, enables crowd sourcing to improve speech to text transcription for diverse, potentially unrelated, devices and users.

Figure 1:
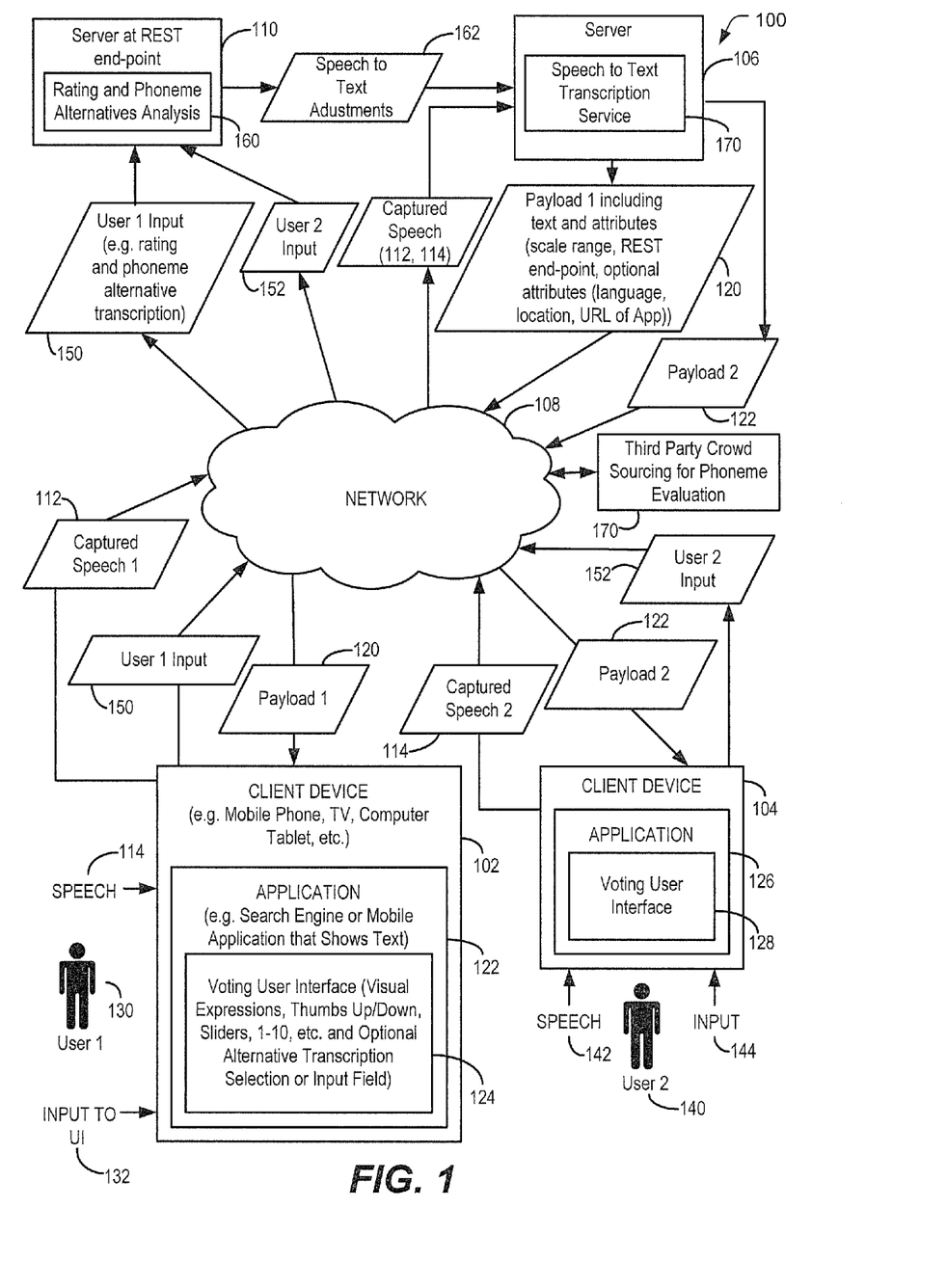
FIG. 1 is a block diagram of a particular embodiment of a distributed computing system.

Referring to FIG. 1, a particular illustrative embodiment of a distributed computer system 100 is shown. The distributed computer system 100 includes a server 106 that provides a speech to text transcription service 170. The server 106 may be a computing device executing instructions to provide automated speech to text transcription. The distributed computer system 100 also includes a computer network 108 that is coupled to a plurality of client devices, such as a representative first client device 102 and a representative second client device 104. The distributed computer system 100 further includes a server at a representational state transfer (REST) endpoint device 110. The server at the REST endpoint device 110 includes rating and phoneme alternatives analysis logic 160. The first client device 102 and the second client device 104 may each be located remotely from the REST endpoint device 110.

Various components of the distributed computer system 100 interact to provide speech to text transcription and to continuously, regularly or occasionally improve or tune a speech to text transcription process using crowd sourcing to provide more accurate transcription of speech. To illustrate, as a general overview, the speech to text transcription service 170 may be implemented by instructions that are executable by a computer to receive captured speech data from a plurality of client devices. The instructions may convert the captured speech data to text for each of the plurality of client devices. The speech to text transcription service 170 may send payload data that includes the text to each of the plurality of client devices. The payload data may include information that can be used to tune or train an algorithm used by the speech to text transcription service 170 to transcribe the speech. For example, the payload data may include one or more attributes that indicate a location of a computer device, such as the server at the REST endpoint device 110, that is configured to process user input related to accuracy of the transcription. The payload data may also include one or more attributes that facilitate gathering of the user input, such as a rating scale range. The user input may be sent to the REST endpoint device 110. User input from the client devices may include information indicating a quality or accuracy of the speech to text transcription, alternate transcription information (e.g., phoneme alternatives), information about the user (e.g., user location, client device type, etc.), and/or other information.

The REST endpoint device 110 may use the user input to determine adjustments (e.g., speech to text adjustment information 162) to tune or train the speech to text transcription service 170. The REST endpoint device 110 may also provide other information to the speech to text transcription service 170 to facilitate speech to text transcription. For example, the REST endpoint device 110 may generate speaker profiles for users of the distributed computing system 100. The speaker profiles may be used to further adjust or improve the speech to text transcription by enabling the speech to text transcription service to account for factors such as geographic location and other characteristics of a particular user. The distributed computing system 100 may also send information to a third party crowd sourcing for phoneme evaluation system 164 to gather additional information that may be used to adjust or improve the speech to text transcription. Thus, the distributed computing system 100 may enable continuous or occasional adjustment and tuning of speech to text transcription even when components of the distributed computing system 100 are unrelated (e.g., are provided by unrelated or distinct business entities).

Each of the client devices 102, 104 may include computer instructions executable by a processor to perform computer implemented methods. For example, a computer implemented method may include capturing speech provided by a user and sending corresponding captured speech data 112, 114 to the speech to text transcription service 170. For example, first speech 134 may be captured by the first client device 102 and corresponding captured speech data 112 may be communicated via the network 108 to the speech to text transcription service 170. In a particular embodiment, the first client device 102 includes an application 136, such as a search engine or a mobile application, that may display text or that may receive speech input from the first user 130.

The computer implemented method may further include receiving a payload, such as the first payload 120, that includes text from the speech to text transcription service 170. The method may further include displaying text at a display device of an electronic device. For example, text from the first payload 120 may be displayed at a display device of the first client device 102. The first client device 102 may further display a user interface that prompts the first user 130 to provide input related to the displayed text. For example, the user interface 124 may prompt the first user 130 to provide the first user input 132. The first user input 132 may include information regarding the accuracy of the displayed text with respect to the captured speech data 112 corresponding to the first speech 134. The computer implemented method may also include receiving user input that may include at least one phoneme alternative to the text. User input data, such as the first user input 150, may be communicated to a remote device, such as to the REST endpoint device 110.

The first client device 102 and the second client device 104 may be the same type of device or may be different types of devices. For example, the first and second client devices 102, 104 may be mobile phones, televisions, computers, gaming devices, tablets, or other electronic devices that includes a display for displaying images and text. In a particular embodiment, the first client device 102 selectively displays the user interface 124. For example, the first client device 102 may selectively launch the user interface 124 upon receiving the first payload 120. Alternatively, an application 136 may receive a plurality of data payloads and may selectively launch the user interface 124 when a certain amount of text has been generated and received via multiple payloads 120 or at a different time as determined by the application 136. To illustrate, the application 136 may collect multiple transcribed words corresponding to a complete sentence prior to launching the user interface 124 to present a display of the complete sentence.

The user interface 124 may gather user ratings or feedback regarding text received from the speech to text transcription service 170. For example, the user interface 124 may display visual expressions that are used to gather the user ratings. Examples of such visual expressions include a thumbs up/thumb down icon, a slider, a scale of 1-10, or another rating display that may be visually presented to the first user 130 to receive user input. The user rating may be provided via the user interface 124 as binary ratings, a range of ratings, or a set of selectable ratings (e.g., more than two selectable ratings). An example of a binary rating is a thumbs up or thumbs down indicator. A range of ratings may be a range from 1-10 or other similar ranges. A set of selectable ratings may be a defined set such that a user may select specific values such as 1, 2, 3, 4, or 5, or a number of stars or other indicators. The user interface 124 may optionally also include alternative transcription selections or an input field for a user to enter text. The first client device 102 is responsive to speech 134 from the first user 130 and is also responsive to the first user input 132 to the user interface 124 that may be provided by the first user 130.

Similarly, the second client device 104 may include a second application 126 and a second user interface 128. The second client device 104 may interact with the second user 140 who provides second speech 142 and second input 144.

The second input 144 may indicate the second user's rating of text received via a second payload 122 from the speech to text transcription service 170.

During operation, the first client device 102 receives the first speech 134 from the first user 130 and captures the first speech 134. Data corresponding to the first speech 134 is communicated as first captured speech data 112 via the network 108 to the speech to text transcription service 170. Similarly, the second client device 104 may capture the second speech 142 and communicate data corresponding to the second speech 142 as second captured speech data 114 via the network 108 to the speech to text transcription service 170. In response to receiving the captured speech data 112, 114, the speech to text transcription service 170 at the server 106 transcribes the captured speech of the first user 130 and the second user 140 and generates text. The server 106 may communicate the first payload 120 that includes transcribed text and other attributes via the network 108 to the first client device 102. Similarly, the server 106 may communicate the second payload 122 that includes transcribed text and attributes via the network 108 to the second client device 104. The attributes of each payload 120, 122 may include a scale range of user input, a REST endpoint identification, other attributes (e.g., a language, a location, or a uniform resource locator (URL) of an application to be executed at a client device), or a combination thereof.

In response to receiving the first payload 120, the first client device 102 may display the transcribed text carried by the first payload 120. The first user 130 may provide the first user input 132 to the user interface 124 in response to the text displayed at the first client device 102. The first user input 132 may indicate user feedback regarding the quality or accuracy of the transcribed text that corresponds to the first captured speech data 112.

The first user 130 may interact with the first client device 102 to provide the first user input 132 in response to the displayed text. For example, the first user 130 may enter the first user input 132 via the user interface 124 in response to display of the transcribed text from the first payload 120. More specifically, the first user 130 may indicate feedback by providing a rating of the transcribed text, such as by using a thumbs up or thumbs down indicator, a slider indicator, a scale of 1-10 (e.g. where 1 is poor transcription and 10 is excellent transcription) or another alternate designator indicating accuracy or quality of the transcription. The user interface 124 may also enable the first user 130 to indicate an alternative transcription corresponding to the first captured speech data 112 or a portion of the first captured speech data 112. To illustrate, the user input 132 may include a selection or text entered into a text field of the user interface 124. For example, the first user 130 may type in a correct word or multiple words of a phrase that accurately corresponds to the first captured speech data 112.

The first client device 102 may communicate the first input 132 as the first user input data 150 to the server at the REST endpoint device 110. For example, the first user input data 150 may include rating and phoneme alternative transcription information. The server at the REST endpoint device 110 may be identified by one of the attributes within the first payload 120. Thus, for each speech to text transcription performed by the speech to text transcription service 170, a user of a client device may provide input, such as rating information and/or phoneme alternatives, and the input may be captured and communicated to the server at the REST endpoint device 110. In a similar manner, the second user 140 may provide second input 144 via the second user interface 128, and the second input 144 may be captured and communicated as second user input data 152 to the server at the REST endpoint device 110.

While only the first and second client devices 102, 104 have been shown, it should be understood that a variety of different types of client devices and a plurality of devices (e.g. more than two devices) may be used. Such devices may be coupled to the network 108, may have access to the speech to text transcription service 170, and may provide user input that is captured and distributed to the server at the REST endpoint device 110. Thus, the distributed computer system 100 may enable crowd sourcing to improve speech to text transcription.

The REST endpoint device 110 may perform rating analysis on a plurality of user ratings based on user input data received from a plurality of client devices. The rating analysis may receive input information that includes a plurality of REST compliant user votes (e.g., ratings associated with transcribed text), source language information, and user location information. For example, the REST endpoint device 110 may receive the first user input data 150 that is related to a first speech to text transcription performed by the speech to text transcription service 170 and the second user input data 152 related to a second speech to text transcription performed by the speech to text transcription service 170 and may perform ratings analysis based on the user input data 150, 152.

In a particular embodiment, the ratings analysis is performed by the rating and phoneme alternatives analysis logic 160 of the server at the REST endpoint device 110, which processes the first user input data 150 and the second user input data 152 in order to generate speech to text adjustment information 162. For example, the rating analysis may include a weighted computation based on information received via the user input data 150, 152, such as ratings associated with particular speech to text transcriptions, user location information, user identification information, and other information. In a particular embodiment, the REST endpoint device 110 collects user identification information of a particular user (such as the first user 130) and generates a speaker profile. The speaker profile may also include information related to context and/or geography of the user or client device (e.g., a geographic location of the first client device 102). The speaker profile may be used by the rating and phoneme alternatives analysis logic 160 to generate the speech to text adjustment information 162. Additionally or in the alternative, the speaker profile may be communicated as part of the speech to text adjustment information 162 to the speech to text transcription service 170 to further refine or tune speech to text transcription performed by the speech to text transcription service 170 for the particular user. The speech to text adjustment information 162 may be dependent on a particular speaker profile.

The speech to text adjustment information 162 may be communicated to the speech to text transcription service 170 of the server 106. The speech to text adjustment information 162 may include information to adjust or tune a speech to text transcription algorithm used by the speech to text transcription service 170.

The REST endpoint device 110 may be implemented by a computing device coupled to the network 108. The REST endpoint device 110 may be located remote from the server 106 or the REST endpoint device 110 and the server 106 may be co-located. Thus, the speech to text adjustment information 162 may be communicated from the REST endpoint device 110 to the server 106 either via the network 108 or via an alternative connection between the REST endpoint device 110 and the server 106.

The network 108 may optionally provide access to a third party crowd sourcing phoneme evaluation system 164. Information from the third party crowd sourcing phoneme evaluation system 164 may be communicated to the speech to text transcription service 170 in order to improve the quality of the speech to text transcription. Alternately, or in addition, the information from the third party crowd sourcing phoneme evaluation system 164 may be communicated to the REST endpoint device 110 and may be used to determine the speech to text adjustment information 162.

In a particular illustrative embodiment, the speech to text transcription service 170 is a multi-tenant service that provides different speech to text transcription applications on behalf of multiple entities. Alternatively, the speech to text transcription service 170 may be a single machine transcription software program from a single entity. The attributes of the payloads (e.g., the first payload 120 and the second payload 122) sent by the speech to text transcription service 170 to client devices (e.g., the first client device 102 and the second client device 104) may include an identifier of the REST endpoint device 110. The client devices 102, 104 may use the identifier to determine a location or address of the REST endpoint device 110 so that the user input data (e.g., the first and second user input data 150, 152) may be sent to the REST endpoint device 110. Thus, user input data that can be used to tune the speech to text transcription algorithm used by the speech to text transcription service 170 can be provided to the REST endpoint device 110 even by client devices that are not associated with the REST endpoint device 110.

In a particular embodiment, the first speech 134 and the second speech 142 may refer to the same spoken word or words and the speech to text transcription service 170 may convert such speech to common text. In another embodiment, due to differences between the speech 134 and 142, the speech to text transcription service 170 may convert the same spoken word or words to different texts. The speech to text transcription service 170 may receive a variety of speech input and may be adjusted responsive to the speech to text adjustment information 162 in order to improve machine text transcription from such speech input.

In a particular embodiment, the first payload 120 includes a first identifier that correlates to the speech to text transcription of the first speech 134 and the second payload 122 includes a second identifier that correlates to the speech to text transcription of the second speech 142. The first identifier of the first payload 120 may be the same as the second identifier of the second payload 122. For example, the identifier may indicate a particular word or phrase transcribed from the speech data 112, 114. Thus, when the first speech 134 and the second speech 142 include the same word or phrase, the first identifier and the second identifier may be the same. Alternatively, the first identifier may be different from the second identifier. The first application 136 may send the first identifier to the REST endpoint device 110 with the first user data 150. The REST endpoint device 110 may determine the speech to text adjustment information 162 based on the first user input 150 and may send the speech to text adjustment information 162 associated with the first user input 150 along with the first identifier to the speech to text transcription service 170. Thus, the speech to text transcription service 170 can correlate user feedback and speech to text adjustment information 162 associated with the first captured speech data 112 to text transcription using the first identifier. Likewise, the second application 126 may send the second identifier to the REST endpoint device 110 with the second user input data 152. The REST endpoint device 110 may determine the speech to text adjustment information 162 based on the second user input data 152 and may send the speech to text adjustment information 162 associated with the second user input data 152 along with the second identifier to the speech to text transcription service 170. Thus, the speech to text transcription service 170 can correlate user feedback and speech to text adjustment information 162 associated with the second captured speech data 114 to text transcription using the second identifier. Using the identifiers, the speech to text transcription service 170 is able to receive feedback from the client devices 102, 104 regarding particular speech to text transcriptions performed by the speech to text transcription service 170, even when the client devices or other aspects of the system 100, such as the ratings and phoneme alternatives analysis logic 160, are not associated with or provided by the speech to text transcription service 170 (i.e., are associated with third-parties, unrelated entities or other service providers).

Service providers, device manufacturers, software providers, and other business entities may participate in the distributed computer system 100 to receive a higher quality product that is influenced directly by customers. Application manufacturers (receivers) may participate in the distributed computer system 100, for example, to provide improved speech to text transcription capability to improve user experience. End users may be encouraged to participate to receive benefit from more accurate speech to text transcription.

Figure 2:
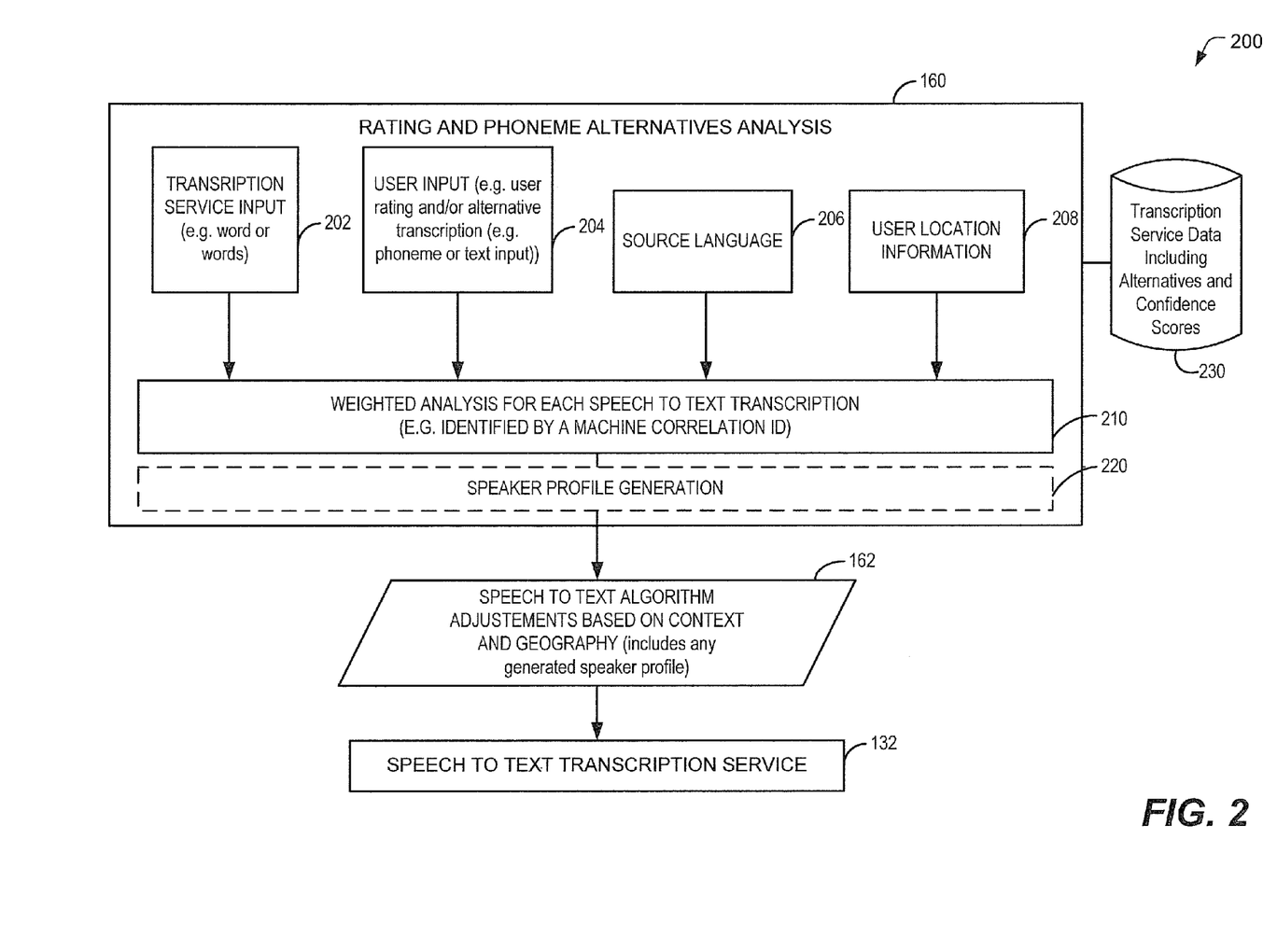
FIG. 2 is a block diagram of a particular embodiment of a portion of the system of FIG. 1.

Referring to FIG. 2, a particular illustrative embodiment of a computer system 200 is shown. The computer system 200 includes the rating and phoneme alternatives analysis logic 160 of the REST endpoint device 110. The rating and phoneme alternatives analysis logic 160 includes processing logic to perform a weighted analysis 210 for speech to text transcription. The weighted analysis 210 may receive transcription service input 202, user input 204, source language input 206, user location information input 208, or a combination thereof. In a particular embodiment, the weighted analysis 210 receives each of the inputs 202-208; however, in other embodiments the weighted analysis 210 receives fewer than all of the inputs 202-208. For example, the weighted analysis 210 may only receive the user input 204 without receiving other information. The transcription service input 202 may include one or more words that are generated by a speech to text transcription service, such as the speech to text transcription service 170 of FIG. 1. The user input 204 may include one or more of the user input data 150, 152 of FIG. 1 and/or other user input of other devices (not shown). In a particular embodiment, the user input 204 includes user rating information related to particular speech to text transcriptions. The user input 204 may optionally include alternative transcriptions suggestions, such as alternative phonemes, or specific text input by a user. The source language input 206 may indicate a language of the speech. The user location information input 208 may include geographic information associated with a source of each user input 204 (e.g., a location of a particular user). The weighted analysis 210 may correspond to a particular correlation identifier that is associated with a particular transcription performed by the speech to text transcription service 170. The correlation identifier may be provided by the speech to text transcription service 170 when particular transcribed text is provided to a client device to enable the client device to provide the speech to text transcription service 170 feedback associated with the particular transcribed text.

In a particular embodiment, the rating and phoneme alternatives analysis logic 160 includes a speaker profile generation module 220. The speaker profile generation module 220 may include instructions that are executable by a computing device to generate a speaker profile for one or more users. For example, when particular user input is received, the particular user input may include or be associated with a speaker profile identifier. The speaker profile identifier may be used to indicate user input received from a particular user. The user input received from the particular user over a period of time may be collected and analyzed in order to generate a speaker profile of the particular user.

The weighted analysis 210 performed by the ratings and phoneme alternatives analysis logic 160 may be used to adjust or tune the speech to text transcription service 170. For example, the rating and phoneme alternatives analysis logic 160 may generate the speech to text adjustment information 162. The speech to text adjustment information 162 may include information related to the speaker profile generated by the speaker profile generation module 220. Examples of speech to text adjustment information 162 may include suggested alternative transcriptions of speech based on user inputs of multiple users that provide feedback regarding accuracy of a transcription of the speech to text transcription service 170. The rating and phoneme alternatives analysis logic 160 may also retrieve transcription service data including alternatives and confidence scores via a database 230. The database 230 may provide information associated with speech to text transcription performed by the speech to text transcription service 170. For example, each transcribed word or words, and alternatives with corresponding confidence scores, may be stored within the database 230. The weighted analysis 210, in response to the user input 204 and in response to other inputs, may consider the alternatives and confidence scores from the database 230 in order to provide the speech to text adjustment information 162 that may be used to enhance or improve accuracy of the speech to text transcription service 170.

The weighted analysis 210 uses a number of inputs to determine the order (confidence) of suggested matches for any given phrase. These inputs include, but are not limited to, the confidence output by the speech to text transcription service 170, responses/judgments from individual users, tuning parameters passed in from or associated with a speaker profile, or manual overrides by a "super user."

By default, the confidence is based on the confidence output by the speech to text transcription service 170. The weighted analysis 210 also uses a ranked list of alternative transcriptions, both for individual words and phrases if available, ranked in confidence order. When correction data is supplied from a user of the system 100, data may be weighted based on the nature of the correction (thumbs up/down, 1-5 stars, alternative word/phrase, etc.) and the historical reliability of the user. For each user provided judgment/response, the system's confidence in a particular word or phrase may be altered, possibly leading to the next alternative becoming the highest confidence/preferred selection. How much weight the system gives to an individual user's responses can be determined using historical input, including how often their responses agree with responses by other users, how long the user has been using the system, etc.

The weightings can be represented as a multiplier assigned to a particular user's vote. System operators can also assign a higher weighting to known and/or vetted users (e.g. professional staff assigned to review and correct results) so that their responses or approval of another user's suggested corrections are more heavily weighted and have a higher impact when being used to compare responses with other users in order to assign confidence values to those users. The system 100 can also support the capability to prevent a particular user's judgments (i.e. the speaker him/herself) from being automatically over-ridden and/or to require manual approval before promoting an alternative over their selection. Thus, the weighted analysis 210 may consider a variety of factors in order to select or adjust a particular word or phrase.

Figure 3:
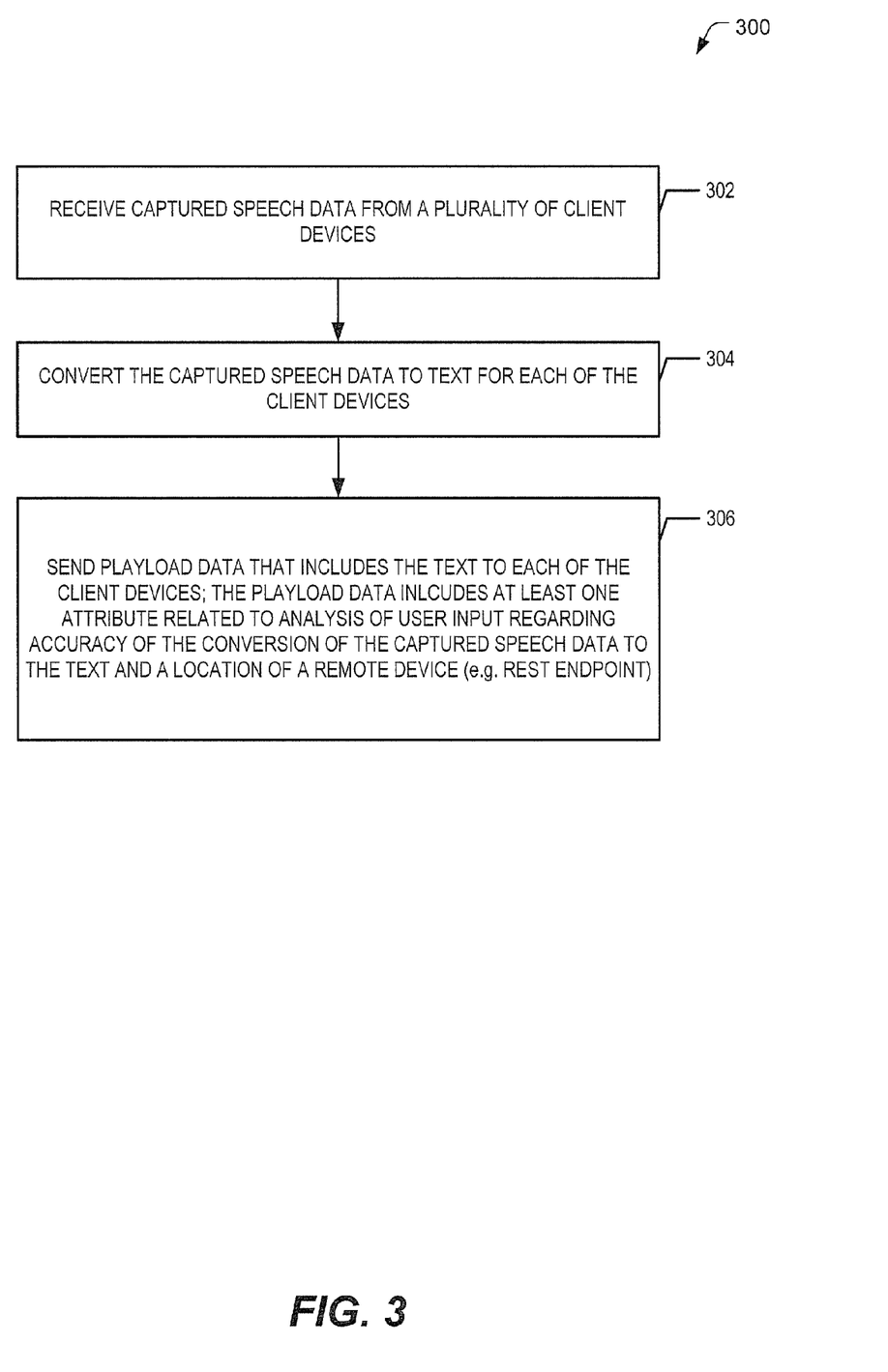
FIG. 3 is a flow diagram of a particular embodiment of a method of speech to text transcription processing.

Referring to FIG. 3, a particular illustrative embodiment of a computer implemented method 300 is shown. The computer implemented method 300 may be performed by a computing device, such as the server 106 of FIG. 1. The computer implemented method 300 includes receiving captured speech data from a plurality of client devices, at 302. For example, the speech to text transcription service 170 of FIG. 1 may receive the captured speech data 112, 114 from the client devices 102, 104, respectively. The computer implemented method 300 may further include converting the captured speech data to text for each of the client devices, at 304. For example, the speech to text transcription service 170 of FIG. 1 may convert the captured speech data 112, 114 to text using one or more speech to text machine transcription methods or algorithms. The computer implemented method 300 further includes sending payload data that includes the text to each of the client devices, at 306. The payload data may also include at least one attribute related to analysis of user input regarding accuracy of the conversion of the captured speech data to the text. The payload data may also include a location (e.g., a communication address or a network address) of a computer device (such as the REST endpoint device 110 of FIG. 1). For example, the speech to text transcription service 170 of FIG. 1 may generate the first payload 120 and the second payload 122, and each payload 120, 122 may include text and attributes. The attributes may include, for example, an address or other data specifying a location of the REST endpoint device 110. The speech to text transcription service 170 may receive captured speech from a plurality of different client devices and may generate corresponding text. The text and attributes may be distributed to the client devices. The attributes may include an identifier of a particular remote device to perform subsequent processing of user feedback related to the accuracy of the text generated by the speech to text transcription service 170. Thus, the computer implemented method 300 enables crowd sourcing to improve speech to text transcription.

Figure 4:
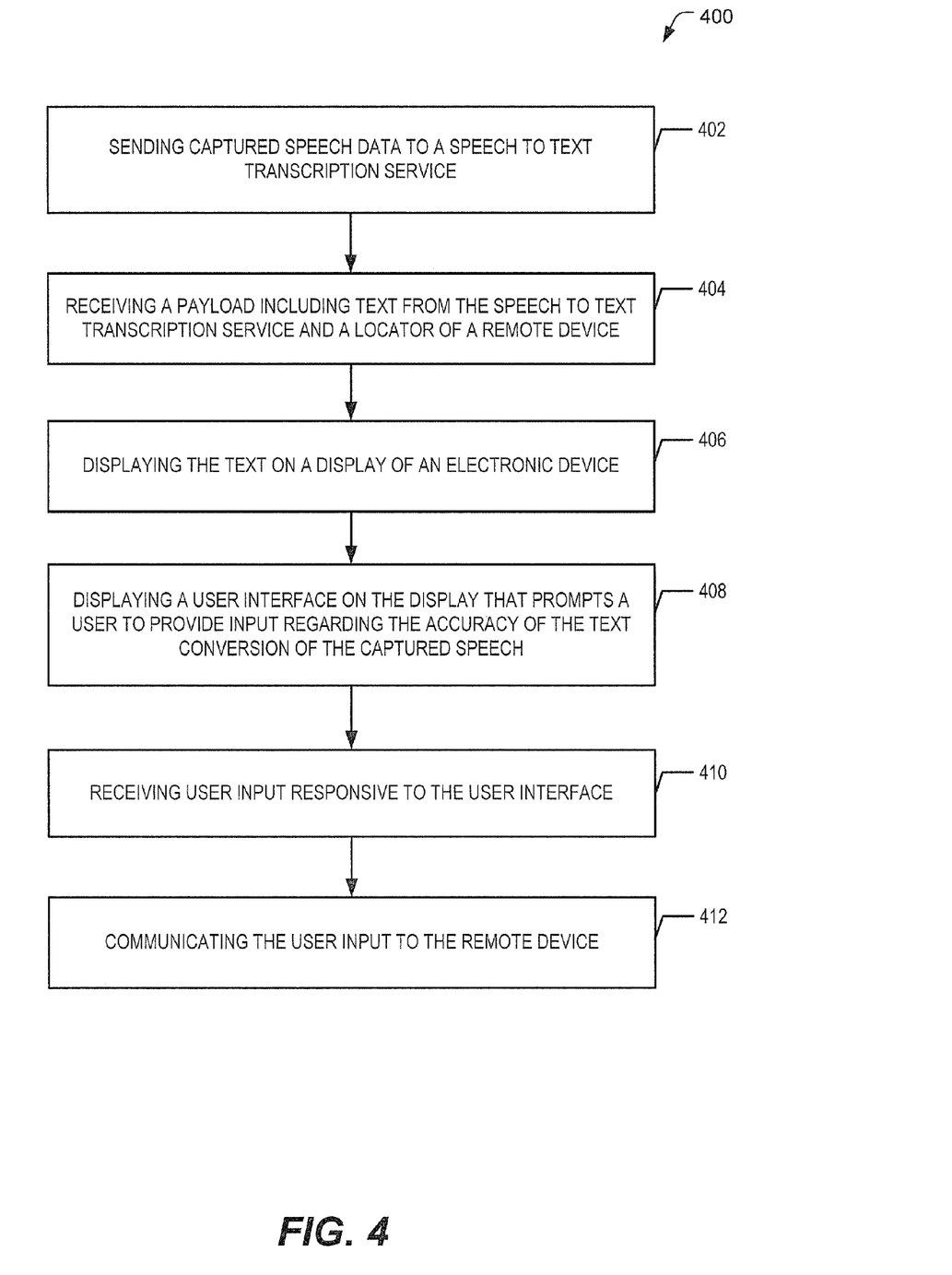
FIG. 4 is a flow diagram of a particular embodiment of a method of processing user input at a client device.

Referring to FIG. 4, a particular illustrative embodiment of a computer implemented method 400 is shown. The computer implemented method 400 may be performed by a client device, such as either of the client devices 102, 104 of FIG. 1. The computer implemented method 400 includes sending captured speech data to a speech to text transcription service, at 402, and receiving a payload including text from the speech to text transcription service, at 404. The payload may also include a locator of a remote device (e.g., an address of a device that gathers user feedback regarding speech to text transcription). The computer implemented method 400 further includes displaying the text at a display device of an electronic device (e.g., a display device of the client device), at 406, and displaying a user interface at the display device, at 408. The user interface may enable the user to provide user input regarding the accuracy of the text transcription of the captured speech. For example, the user interface may prompt the user to rate the accuracy of the text. The user interface may also enable the user to provide an alternative transcription of the text or a portion of the text (e.g., to suggest one or more phoneme alternative transcriptions). The computer implemented method 400 further includes receiving the user input via the user interface, at 410, and communicating the user input to the remote device, at 412. For example, the first client device 102 of FIG. 1 may send the captured speech data 112 to the speech to text transcription service 170. The first client device 102 may receive the first payload 120 from the speech to text transcription service 170. The first payload 120 may include the transcribed text and a locator (e.g., an address) of the REST endpoint device 110. The first client device 102 may display the text from the first payload 120 and may display the user interface 124. The first client device 102 may receive the first user input 132 via the user interface 124 and may communicate the first user input data 150 derived from the first user input 132 to the server at the REST endpoint device 110.

Thus, the computer implemented method 400 may enable a client device to receive text from a speech to text transcription service and to provide user input in response to the text via an interactive user interface. The interactive user interface may be used to prompt and receive feedback from a user regarding accuracy of the text generated by the speech to text transcription service 170. Thus, the computer implemented method 400 enables use of crowd sourcing to improve speech to text transcription.

Figure 5:
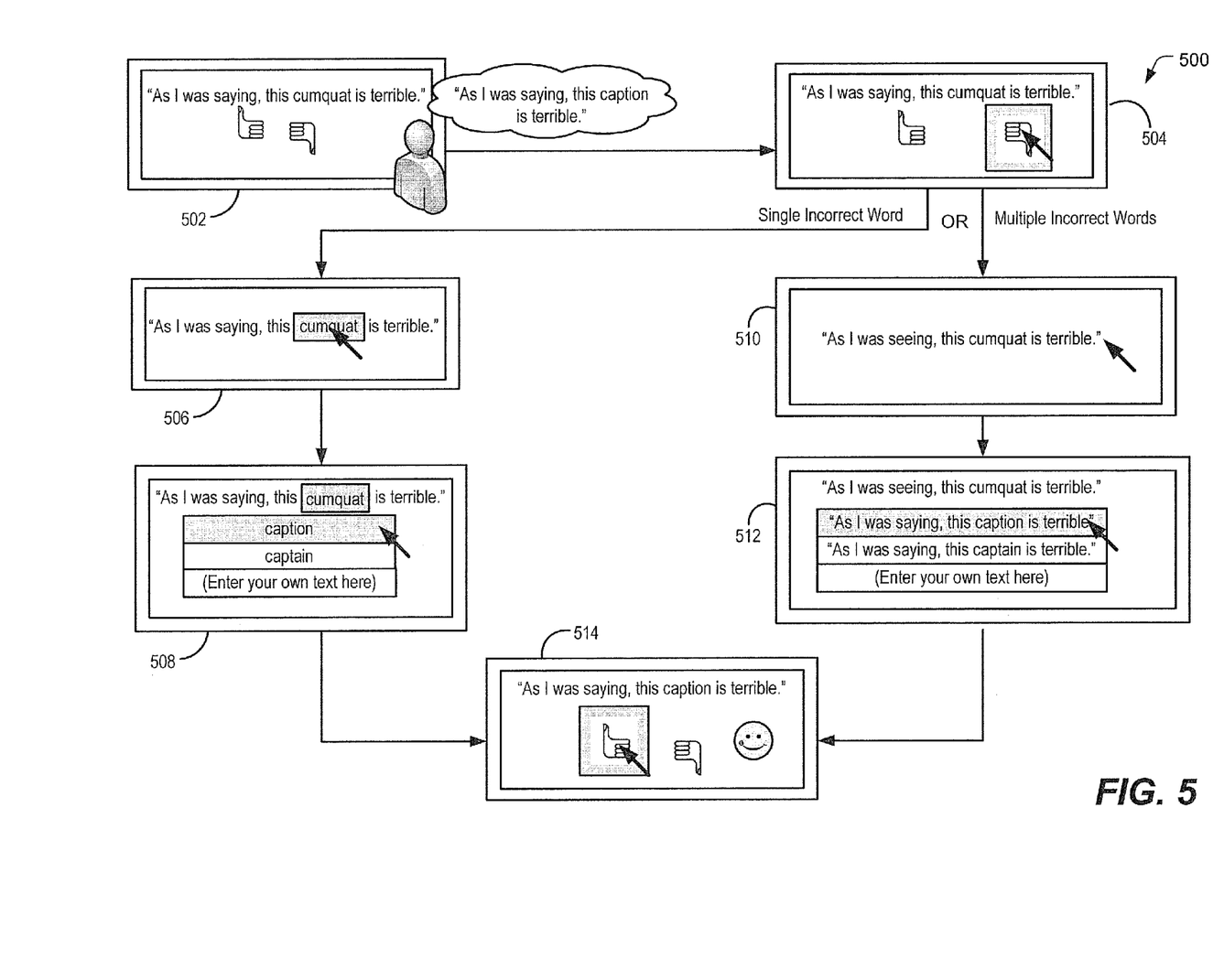
FIG. 5 is a diagram that illustrates a portion of a user interface that may be displayed by a client device.

Referring to FIG. 5, a particular illustrative embodiment of a portion 500 of a user interface that may be displayed at a client device is shown. For example, the portion 500 of the user interface may be a portion of the user interface 124 of FIG. 1, which may be presented at a display device of the first client device 102. The portion 500 of the user interface may include a first view 502 that includes transcribed text received from a speech to text transcription service in response to speech data. In the example illustrated in FIG. 5, the transcribed text is, "As I was saying, this cumquat is terrible." The first view 502 may also include a user selectable option to provide feedback regarding a quality or accuracy of the transcribed text relative to the speech data. For example, the user selectable option may include a thumbs up and a thumbs down indicator. In the example illustrated in FIG. 5, the speech data included the sentence, "As I was saying, this caption is terrible." Thus, the user of the interface may indicate a low rating of the text corresponding to the input speech by selecting the thumbs down indicator as shown at a second view 504. When the user provides negative feedback, e.g., by selecting the thumbs down indicator, the user interface may enable the user to indicate whether a single word or multiple words of the transcribed text are deemed to be incorrect.

For the case of a single incorrect word, a revised view 506 may be presented. The revised view 506 may be used to highlight a particular word that has been transcribed incorrectly. Upon selecting the particular word as shown by the revised view 506, an updated view 508 may be displayed. The updated view 508 may include user options to provide an alternate word to replace the highlighted word. For example, the updated view 508 may include a dropdown menu that lists alternative transcriptions for the highlighted word. In another example, the updated view 508 may include another user interface field to receive input to correct the highlighted word, such as a text entry field. To illustrate, for the selected word "cumquat" a plurality of selections may be shown, such as the selections "caption," and "captain," and/or a blank text field where a user may enter his or her own alternative word. Upon selection of one of the presented alternatives or upon the user inputting text, a second revised view 514 may be displayed. The second revised view 514 displays revised transcribed text, such as "As I was saying, this caption is terrible." The user may indicate acceptance of the revised transcribed text by selecting a thumbs up indicator. Feedback may be provided to the user to indicate that the revised transcribed text has been received. For example, in response to the user selecting the thumbs up indicator, a positive icon may be shown, such as a "smiley face" as illustrated in the second revised view 514. Alternately, when the user provided input indicates that the revised transcribed text is not correct (e.g., by selecting the thumbs down icon), the user interface may again prompt the user to highlight a word to be changed, for example, by returning to the revised view 506 displaying the revised transcribed text.

In a scenario where multiple words are indicated or selected to be revised or displayed, a view 510 may be presented. The view 510 may display multiple alternate words, such as alternate phrases or sentences. As shown at view 512, the user may select (or enter text) indicating that an entire phrase or sentence is to be replaced with an alternative phrase or sentence. In response to user input indicating the alternative phrase or sentence, the second revised view 514 is presented. Thus, a user may interact with the user interface in order to view transcribed text corresponding to prior speech input and to provide feedback or other user input with respect to the quality or accuracy of the transcribed text as compared to the speech input.

Figure 6:
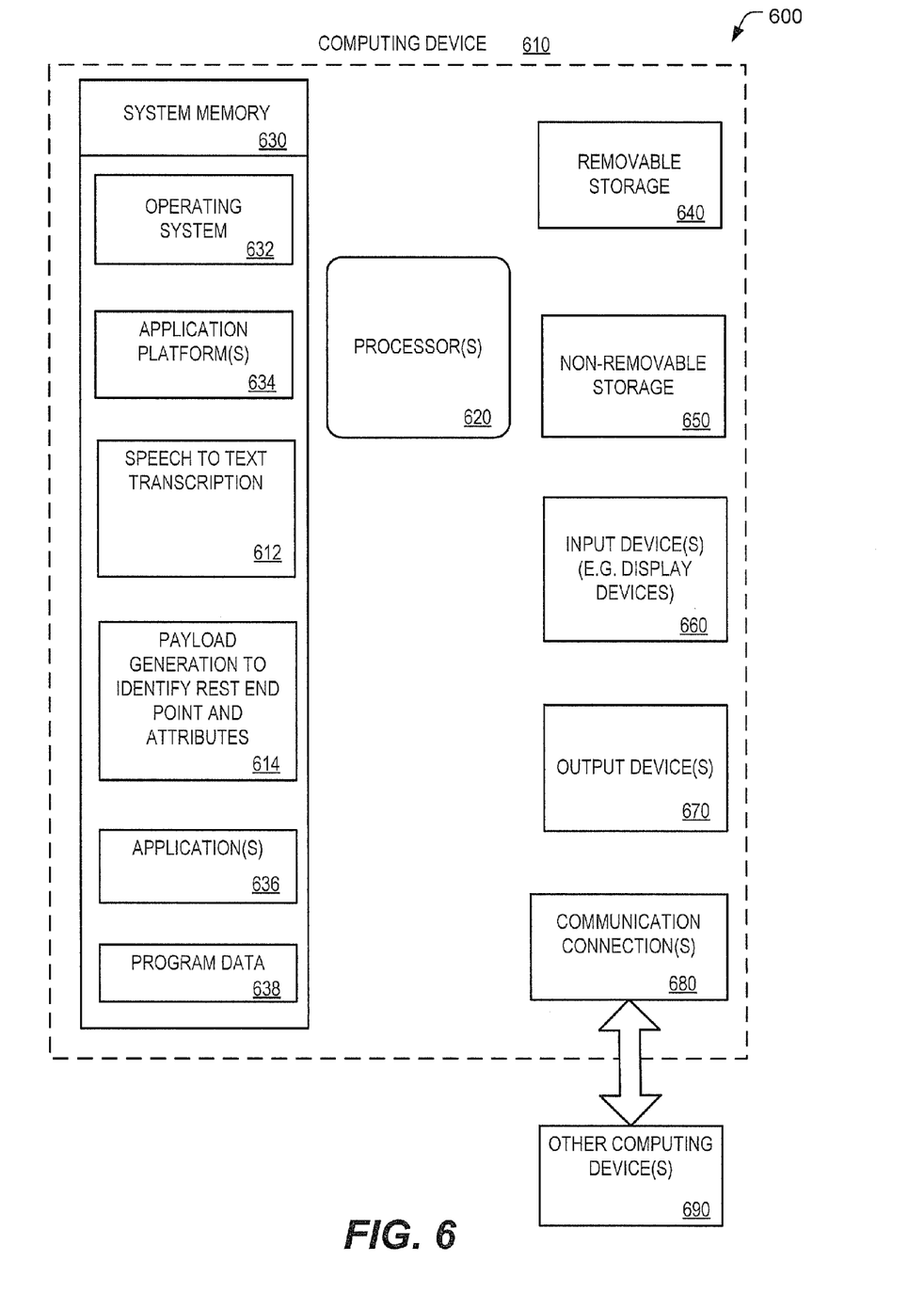
FIG. 6 is a block diagram of a particular embodiment of a computing device.

FIG. 6 depicts a block diagram of a computing environment 600 including a computing device 610 operable to support embodiments of systems, methods, and computer program products according to the present disclosure.

The computing device 610 includes at least one processor 620 and a system memory 630. Depending on a configuration and type of the computing device 610, the system memory 630 may be volatile (such as random access memory or "RAM"), non-volatile (such as read-only memory or "ROM," flash memory, and similar memory devices that maintain stored data even when power is not provided), or some combination of the two. The system memory 630 typically includes an operating system 632, one or more application platforms 634, one or more applications 636, and program data 638. The system memory 630 may also include a speech to text transcription application 612 and a payload generation application 614. In an illustrative embodiment, the speech to text transcription application 612, the payload generation application 614, or any combination thereof, may include instructions that are executable by the processor(s) 620 to perform the functions and methods disclosed herein. For example, functionality of the server 106 of FIG. 1 may be performed by the applications 612 and 614 or by the operating system 632. Alternatively or in addition, the computing device 610 may be used to implement the functions of the REST endpoint device 110 and the functions of the rating and phoneme alternatives analysis logic 160 of FIGS. 1 and 2. The computing device 610 may also be used to implement any of the computer implemented methods or computing devices disclosed herein, such as the methods illustrated in FIGS. 3 and 4. In this case, the applications 612, 614 would be replaced by client device applications. The computing device 610 may also be used to implement or display one or more of the user interfaces disclosed herein, such as the user interfaces illustrated in FIGS. 1 and 5.

The computing device 610 may also have additional features or functionality. For example, the computing device 610 may include removable and/or non-removable additional data storage devices, such as magnetic disks, optical disks, tape devices, and standard-sized or flash memory cards. Such additional storage is illustrated in FIG. 6 by removable storage 640 and non-removable storage 650. Computer storage media may include volatile and/or non-volatile storage and removable and/or non-removable media implemented in any technology for storage of information such as computer-readable instructions, data structures, program components or other data. The system memory 630, the removable storage 640 and the non-removable storage 650 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information that can be accessed by the computing device 610. Any such computer storage media may be part of the computing device 610.

The computing device 610 may also have input device(s) 660, such as a keyboard, a mouse, a pen, a voice input device, a touch input device, a motion or gesture input device, etc, connected via one or more wired or wireless input interfaces. In an illustrative embodiment, the input device(s) 660 may receive user input, such as the user input 132, 144 of FIG. 1. Output device(s) 670, such as a display, speakers, printer, etc. may also be connected via one or more wired or wireless output interfaces. The output devices 670 may include one or more display devices. For example, a display device may be associated with any of the client devices 102, 104 of FIG. 1.

The computing device 610 also includes one or more communication connections 680 that allow the computing device 610 to communicate with other computing devices 690 over a wired or a wireless network, such as the network 108 of FIG. 1.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving, at a computer device configured to process user input related to conversion of speech data to text, a first user input from a first client device related to a first speech to text conversion performed by a speech to text transcription service, wherein the first user input includes a first user rating and a phoneme alternative, wherein the speech to text transcription service is configured to receive first speech data from the first client device and to perform speech to text transcription on the first speech data to generate first text and to generate a first payload that includes the first text and first attributes, and wherein the first attributes include a user feedback scale range and an identifier of the computer device;
    receiving, at the computer device, a second user input from a second client device related to a second speech to text conversion performed by the speech to text transcription service; and
    processing the first user input and the second user input at the computer device to generate speech to text adjustment information.

2. The method of claim 1, wherein the second user input includes a second user rating and a second phoneme alternative supplied by the second client device.

3. The method of claim 1, wherein the first client device is a different type of device than the second client device.

4. The method of claim 1, wherein the speech to text adjustment information is based at least in part on a speaker profile.

5. The method of claim 1, wherein the first client device and the second client device are located remote from the computer device and wherein the computer device comprises a computer server coupled to a network.

6. The method of claim 1, wherein the speech to text transcription service receives second speech data from the second client device, performs speech to text transcription on the second speech data to generate second text, and generates a second payload that includes the second text and second attributes.

7. The method of claim 6, wherein the first attributes include the phoneme alternative.

8. The method of claim 6, wherein the second attributes include at least one of alternative words or phrases based on the second text.

9. The method of claim 8, wherein the first payload further includes a first identifier that correlates to the first text, and wherein a second payload includes a second identifier that correlates to the second text.

10. The method of claim 9, wherein the first identifier and the second identifier are a common identifier.

11. The method of claim 8, wherein a plurality of devices in addition to the first client device and the second client device have access to the speech to text transcription service and receive payload data including information identifying the computer device.

12. The method of claim 1, wherein the first payload is communicated to the first client device.

13. The method of claim 1, wherein the first attributes further include language information, location information, and a uniform resource locator of an application to execute an interface to collect the first user rating at the first client device.

14. The method of claim 1, wherein the first client device executes a first application and selectively launches a first user interface upon receiving the first payload.

15. The method of claim 1, wherein the computer device performs rating analysis on a plurality of user ratings from received user input, wherein the received user input includes at least one of a plurality of votes, source language information, and user location information, and wherein the rating analysis includes using a weighted computation based on the received user input to generate the speech to text adjustment information.

16. The method of claim 1, further comprising sending the speech to text adjustment information to the speech to text transcription service.

17. A computer readable storage device including instructions executable by a computer to:
receive captured speech data from a plurality of client devices;
convert the captured speech data to text for each of the plurality of client devices; and
send payload data that includes the text to each of the plurality of client devices, wherein the payload data includes at least one attribute that indicates a location of a remote computer device configured to process user input related to accuracy of the conversion of the captured speech data to the text, and wherein the payload data is configured to enable each client device to collect user input and send the collected user input to the remote computer device for processing, the collected user input including a vote, source language information, and user location information, wherein the payload data is also configured to enable the collected user input to be used to perform a rating analysis to generate speech to text adjustment information.

18. The computer readable storage device of claim 17, wherein the at least one attribute is a uniform resource locator (URL) of a representation state transfer (REST) endpoint device and the votes are REST compliant votes.

19. A computer implemented method comprising:
sending captured speech data to a speech to text transcription service;
receiving a payload including text from the speech to text transcription service;
displaying the text at a display of an electronic device;
displaying a user interface at the display, wherein the user interface enables receipt of user input regarding accuracy of the text;
receiving the user input and at least one phoneme alternative to the text; and
communicating the user input and the at least one phoneme alternative to a remote device, wherein the user input communicated to the remote device is configured to be useable with user input communicated to the remote device by a plurality of client devices, wherein each specific user input received from each specific client device is generated by capturing speech data at the specific client device, sending the speech data to the speech to text transcription service, and receiving a specific payload at the specific client device, wherein the specific payload includes attributes including a user feedback scale range, at least one phoneme alternative to transcribed text associated with the speech data, and an identifier of the remote device.

20. The method of claim 19, wherein the remote device is a server at a REST endpoint device.

* * * * *